United States Patent [19]

Chen

[11] Patent Number: 5,344,047
[45] Date of Patent: Sep. 6, 1994

[54] AUTOMATIC LIQUID SOAP DISPENSER

[75] Inventor: Ching-Shih Chen, Taipei, Taiwan

[73] Assignee: Shih Kong, Inc., Taipei, Taiwan

[21] Appl. No.: 134,240

[22] Filed: Oct. 8, 1993

[51] Int. Cl.⁵ ............................................. B67D 5/08
[52] U.S. Cl. ........................................ 222/63; 4/605;
4/903; 222/52; 222/185; 222/333; 222/340
[58] Field of Search ................... 222/52, 63, 181, 185, 222/333, 340; 4/605, 903

[56] References Cited

U.S. PATENT DOCUMENTS

| | | | |
|---|---|---|---|
| 2,898,009 | 8/1959 | Green | 222/340 X |
| 3,089,618 | 5/1963 | Forsyth | 222/63 X |
| 4,722,372 | 2/1988 | Hoffman et al. | 222/52 X |
| 4,938,384 | 7/1990 | Piolla et al. | 222/52 |
| 4,946,070 | 8/1990 | Albert et al. | 222/181 X |
| 4,967,935 | 11/1990 | Celeste | 222/52 X |
| 5,105,992 | 4/1992 | Fender et al. | 222/52 X |
| 5,215,216 | 6/1993 | Van Marcke | 222/52 X |
| 5,249,718 | 10/1993 | Muderlak | 222/333 X |

FOREIGN PATENT DOCUMENTS 2244473  12/1991  United Kingdom ................. 222/52

Primary Examiner—Andres Kashnikow
Assistant Examiner—Joseph A. Kaufman
Attorney, Agent, or Firm—Skjerven, Morrill, MacPherson, Franklin, & Friel

[57] ABSTRACT

An automatic liquid soap dispenser includes a liquid soap container which receives liquid soap therein and which has a bottom wall that is formed with an outlet port. A flow control unit includes a plunger and a tubular body secured to a bottom surface of the bottom wall such that a through-hole at a closed rear portion of the tubular body is aligned with the outlet port. The closed rear portion of the tubular body is further formed with an upright soap outlet adjacent to the through-hole. A ball valve unit controls the flow of liquid soap through the soap outlet. The plunger has a piston which extends fittingly and movably into the tubular body via an open front portion of the latter, and a flexible shaft portion connected to the piston. An actuating unit includes an infrared unit for detecting a target, a driving unit activated by the infrared unit upon detection of the target, and a driving gear driven rotatably by the driving unit. The shaft portion of the plunger is connected eccentrically to the driving gear so that rotation of the driving gear results in linear movement of the piston within the tubular body to dispense a predetermined amount of the liquid soap through the soap outlet. A contact switch is activated by the driving gear when the driving gear completes one revolution and deactivates the driving unit when activated.

5 Claims, 4 Drawing Sheets

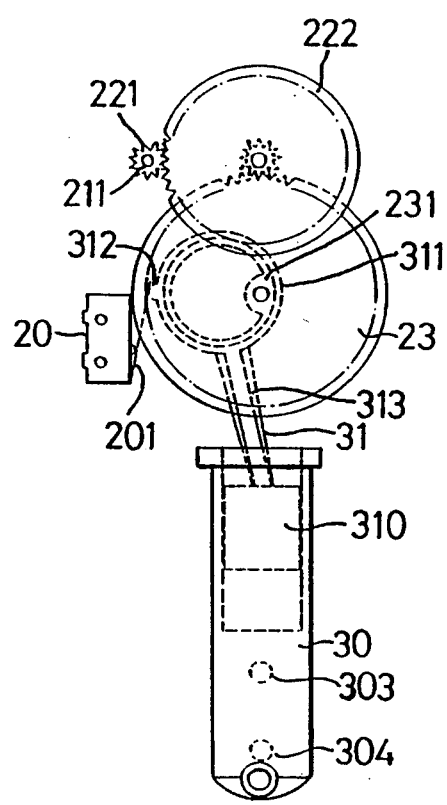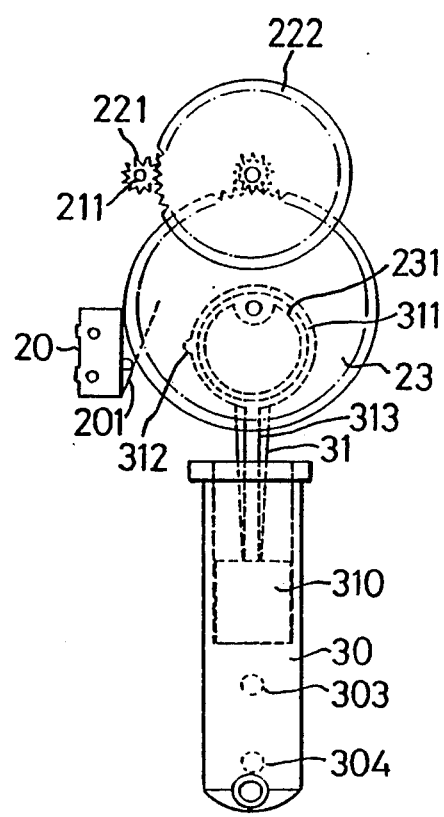
FIG. 6    FIG. 8
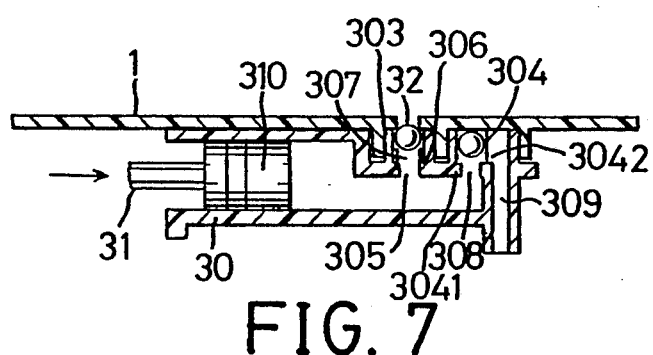
FIG. 7
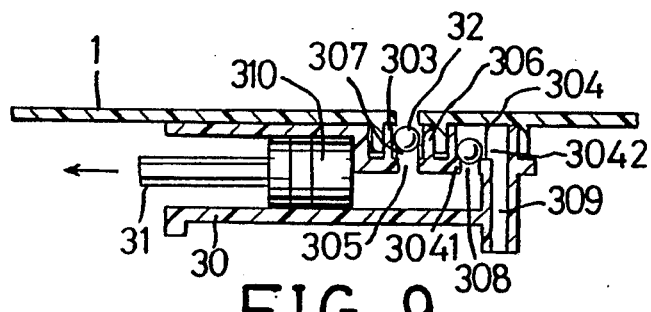
FIG. 9

AUTOMATIC LIQUID SOAP DISPENSER

BACKGROUND OF THE INVENTION

1. Field of the Invention

The invention relates to a liquid soap dispenser, more particularly to an automatic liquid soap dispenser which is capable of supplying a predetermined amount of liquid soap when activated and which can prevent leakage of the liquid soap effectively.

2. Description of the Related Art

Liquid soap dispensers are installed in public toilets and deliver small amounts of liquid soap when operated. A first type of conventional liquid soap dispenser requires manual operation of the same before liquid soap can be delivered to the hands of a user. Liquid soap dispensers which belong to this type are inconvenient to use and are unsanitary since physical contact therewith may result in the contraction of germs.

A second type of conventional liquid soap dispenser is capable of delivering automatically small amounts of liquid soap onto the hands of a user without manual operation thereof or physical contact therewith. Liquid soap dispensers which belong to this type usually employ an infrared unit to control the dispensing of liquid soap automatically. Upon detection of a target, such as the user's hands, the infrared unit activates a pump actuating unit to activate correspondingly a spring-type pump unit in order to dispense a predetermined amount of liquid soap from a soap container. This type of liquid soap dispenser is convenient to use and prevents the dispensing of excessive amounts of liquid soap.

Prolonged use of liquid soap dispensers which belong to the second type, however, results in several drawbacks. For example, fatigue of the spring-type pump unit occurs, thereby affecting the ability of the pump unit to return to a fully-closed position and thereby diminishing the amount of liquid soap dispensed by the dispenser. Furthermore, leakage of the liquid soap can occur since the pump unit is unable to return to the fully-closed position.

SUMMARY OF THE INVENTION

Therefore, the objective of the present invention is to provide an automatic liquid soap dispenser which can overcome the above mentioned drawbacks that are commonly associated with the prior art.

More specifically, the objective of the present invention is to provide an automatic liquid soap dispenser which is capable of supplying a predetermined amount of liquid soap when activated and which can prevent the leakage of liquid soap effectively.

Accordingly, the automatic liquid soap dispenser of the present invention comprises:

a liquid soap container which confines a hollow space for receiving liquid soap therein, the soap container having a bottom wall which is formed with an outlet port and which has a bottom surface;

a flow control unit including: a tubular body with an open front portion and a closed rear portion which is formed with adjacent first and second annular outward projections that respectively confine a through-hole communicated with an interior of the tubular body, the tubular body being secured to the bottom surface of the bottom wall of the liquid soap container such that the through-hole of the first annular outward projection is aligned with the outlet port, the closed rear portion of the tubular body being further formed with an upright soap outlet disposed adjacent to and communicated with the through-hole of the second annular outward projection, the second annular outward projection having a lower end which is formed with a valve seat, and a first ball member disposed movably within the second annular outward projection on the valve seat, the second annular outward projection and the first ball member serving as a ball valve unit to control flow of the liquid soap through the soap outlet; and a plunger having a piston which extends fittingly and movably into the tubular body via the open front portion, and a flexible shaft portion which has a first end connected to the piston and a second end; and an actuating unit mounted on the liquid soap container and including: an infrared unit for detecting a target; a driving unit connected to the infrared unit and activated by the infrared unit upon detection of the target; a speed changing gear set driven rotatably by the driving unit; a driving gear driven rotatably by the speed changing gear set, the second end of the shaft portion of the plunger being connected eccentrically to the driving gear, rotation of the driving gear resulting in linear movement of the piston of the plunger within the tubular body to open the ball valve unit and dispense a predetermined amount of the liquid soap through the soap outlet; and a contact switch disposed on one side of the driving gear and activated by the driving gear when the driving gear completes one revolution, the contact switch being connected to the driving unit and deactivating the driving unit when activated.

BRIEF DESCRIPTION OF THE DRAWINGS

Other features and advantages of the present invention will become apparent in the following detailed description of the preferred embodiment, with reference to the accompanying drawings, of which:

FIG. 6 illustrates the preferred embodiment when in a first operating state;

FIG. 7 is a sectional view of the flow control unit when the preferred embodiment is in the first operating state;

FIG. 8 illustrates the preferred embodiment when in a second operating state; and FIG. 9 is a sectional view of the flow control unit when the preferred embodiment is in the second operating state.

DETAILED DESCRIPTION OF THE PREFERRED EMBODIMENT

Referring to FIGS. 1 to 4, the preferred embodiment of an automatic liquid soap dispenser according to the present invention is shown to comprise a liquid soap container 1, an actuating unit 2, and a flow control unit 3.

Figure 1:
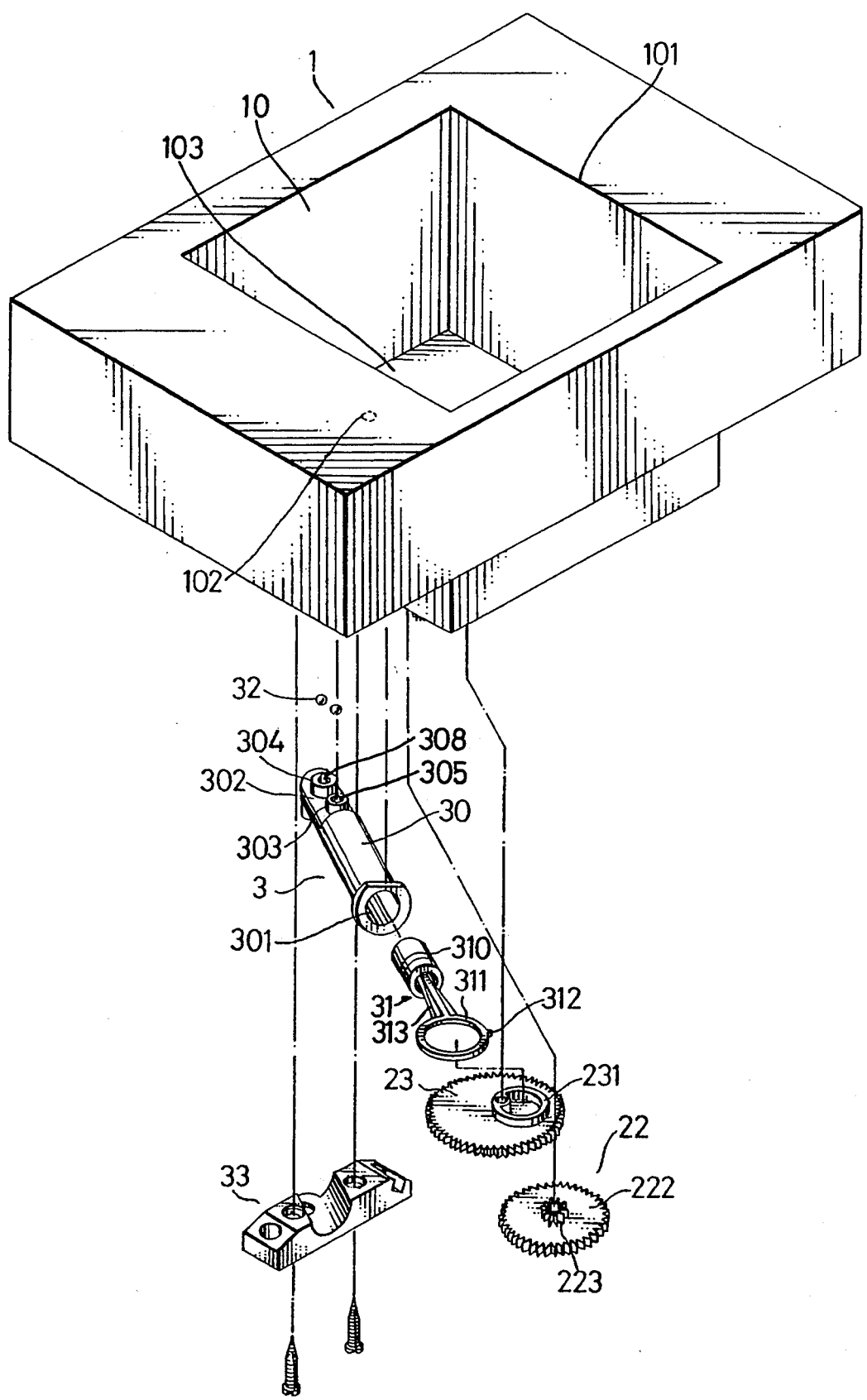
FIG. 1 is an exploded view of the preferred embodiment of an automatic liquid soap dispenser according to the present invention.
Figure 2:
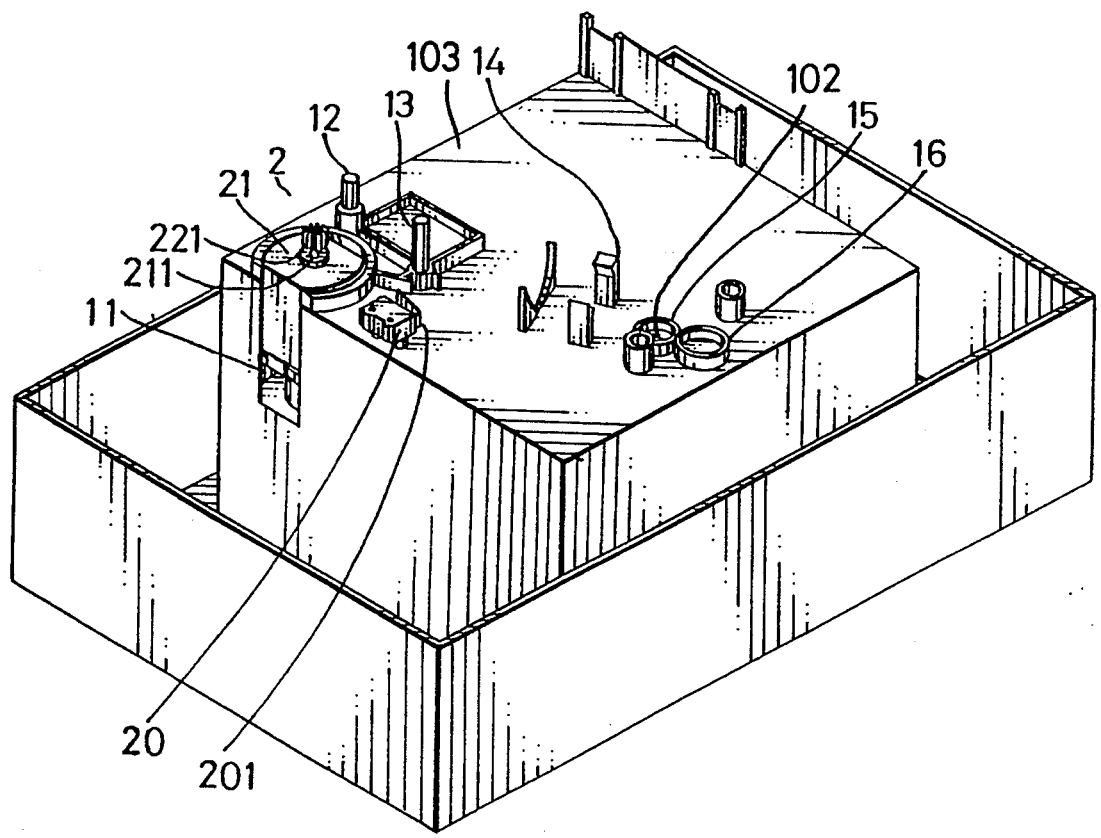
FIG. 2 is a rear perspective view of a soap container of the preferred embodiment.

Referring to FIGS. 1 and 2, the soap container 1 confines a hollow space 10 for receiving liquid soap therein. The liquid soap is poured into the hollow space 10 via an open top 101 of the latter. The soap container 1 has a bottom wall 103 which is formed with an outlet port 102 to permit the flow of liquid soap out of the hollow space 10. The bottom wall 103 has a bottom surface which is formed with a retaining groove 11, first and second gear axles 12, 13 disposed adjacent to the retaining groove 11 on one side of the latter, a pair of opposed retaining hooks 14 on one side of the second gear axle 13, and adjacent first and second ring projections 15, 16. The first ring projection 15 is disposed around the outlet port 102.

Referring to FIGS. 1 to 5, the actuating unit 2 includes a contact switch 20, a driving unit 21, a speed changing gear set 22, a driving gear 23, and an infrared unit 24. The contact switch 20 has a movable switch contact 201 and is used to control the operation of the driving unit 21. Operation of the driving unit 21, such as a motor, is initiated by the infrared unit 24 and is terminated by the contact switch 20. The driving unit 21 has an output shaft 211. The speed changing gear set 22 includes a first small gear wheel 221 and a large gear wheel 222. The first small gear wheel 221 is mounted on the output shaft 211 of the driving unit 21. The large gear wheel 222 is secured rotatably on the first gear axle 12 and meshes with the first small gear wheel 221. A second small gear wheel 223 is formed integrally on one side of the large gear wheel 222. The driving gear 23 is secured rotatably on the second gear axle 13 and meshes with the second small gear wheel 223. Therefore, rotation of the output shaft 211 of the driving unit 21 can result in corresponding rotation of the driving gear 23. The driving gear 23 has one side which is formed with an eccentric annular projection 231. The contact switch 20 is fixed to the bottom surface of the bottom wall 103 of the soap container 1 such that the movable switch contact 201 is disposed on one side of the second gear axle 13.

Figure 3:
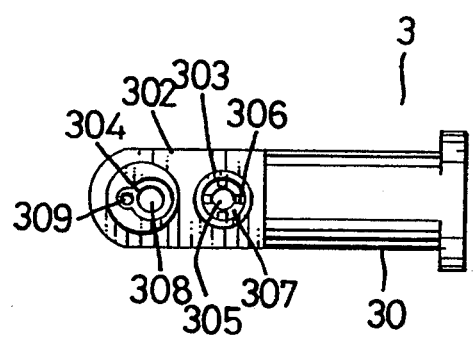
FIG. 3 is a top view of a tubular body of a flow control unit of the preferred embodiment.

Referring to FIG. 3, the flow control unit 3 includes a tubular body 30, a plunger 31 and two ball members 32. The tubular body 30 has an open front portion 301 and a closed rear portion which is formed with a longitudinal cut-out, thereby forming an indented section 302 thereat. The indented section 302 is formed with adjacent first and second annular outward projections 303, 304 that respectively confine a through-hole 305, 308 communicated with an interior of the tubular body 30. The first and second annular outward projections 303, 304 extend fittingly into a respective one of the first and second ring projections 15, 16 at the bottom wall 103 of the soap container 1 when the tubular body 30 is secured onto the latter by means of a retaining member 33. The first annular outward projection 303 has a lower portion which is formed with four angularly spaced and inwardly projecting radial ribs 306. A passage 307 is defined between two adjacent radial ribs 306. Liquid soap in the hollow space 10 of the soap container 1 flows into the tubular body 30 via the passages 307 in the through-hole 305 confined by the first annular outward projection 303. The indented section 302 of the tubular body 30 is further formed with an upright soap outlet 309 which is disposed adjacent to the through-hole 308 of the second annular outward projection 304. Referring to FIG. 7, the second annular outward projection 304 has a lower end which is formed with an inwardly projecting annular valve seat 3041. An axially extending slit 3042 is disposed above the valve seat 3042 and communicates the through-hole 308 with the soap outlet 309. Each of the ball members 32 is disposed movably within a respective one of the first and second annular outward projections 303, 304. The first annular outward projection 303 and the ball member 32 within the same serve to control the flow of liquid soap into the tubular body 30. The second annular outward projection 304 and the ball member 32 within the same serve as a ball valve unit to control the flow of liquid soap through the soap outlet 309.

The plunger 31 is made of a flexible plastic material and has a piston 310 which extends fittingly and movably into the tubular body 30 via the open front portion 301 of the latter. The plunger 31 further has a flexible shaft portion 313 which interconnects the piston 310 and a retaining ring 311. The retaining ring 311 is sleeved around the eccentric annular projection 231 of the driving gear 23 and is formed with a switch actuator 312 which projects radially outward therefrom. Whenever the driving gear 23 completes one revolution, the switch actuator 312 presses against the movable switch contact 201 of the contact switch 20 so as to activate the latter.

Figure 4:
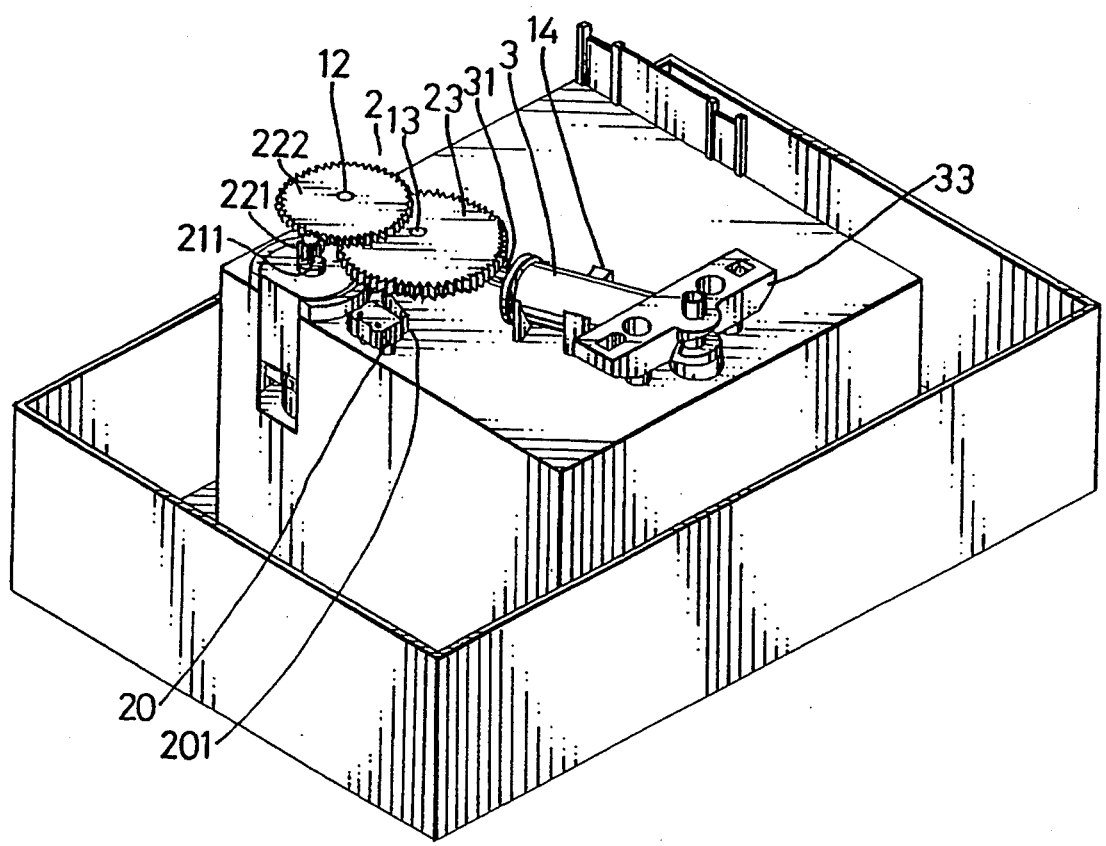
FIG. 4 is a rear perspective view which illustrates the assembly of the preferred embodiment.
Figure 5:
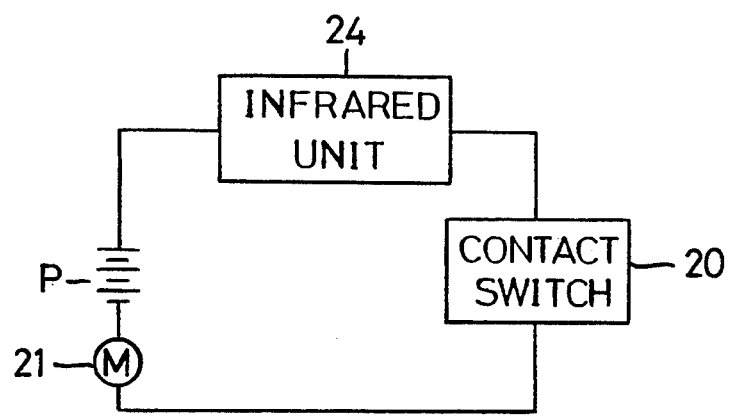
FIG. 5 is a simplified circuit diagram of the electrical components of the preferred embodiment.

Referring to FIGS. 4 and 5, upon detection of a target, such as the hands of a user, the infrared unit 24 activates the driving unit 21, thereby causing the driving gear 23 to rotate. Clockwise rotation of the driving gear 23 causes the piston 310 of the plunger 31 to move linearly within the tubular body 30 from the position shown in FIG. 7 to the position shown in FIG. 9. Under this condition, the piston 310 forces the liquid soap inside the tubular body 30 to open the ball valve unit constituted by the second annular outward projection 304 and the ball member 32 within the latter by forcing the ball member 32 to move away from the valve seat 3041, thereby permitting the flow of liquid soap in the tubular body 30 through the soap outlet 309 via the slit 3042, as shown in FIG. 7.

When the piston 310 reaches the position shown in FIGS. 8 and 9, further clockwise rotation of the driving gear 23 causes the piston 310 of the plunger 31 to move within the tubular body 30 from the position shown in FIG. 8 back to the position shown in FIG. 6. Under this condition, the piston 310 moves away from the closed rear portion of the tubular body 30. The ball member 32 within the second annular outward projection 304 blocks the valve seat 3041 to prevent the flow of liquid soap through the slit 3042, as shown in FIG. 9. At the same time, liquid soap flows from the soap container 1 and into the tubular body 30 via the passages 307 in the through-hole 305 of the first annular outward projection 303. Eventually, the switch actuator 312 on the retaining ring 311 of the plunger 31 presses against the movable switch contact 201 of the contact switch 20 so as to activate the latter. At this instant, the contact switch 20 disrupts the flow of current from a power source (P) to the driving unit 21, thereby deactivating the driving unit 21.

It has thus been shown that the present invention is capable of supplying a predetermined amount of liquid soap when activated. Furthermore, the provision of the ball valve unit can prevent the leakage of liquid soap effectively. The features and objects of the present invention are thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An automatic liquid soap dispenser, comprising:
a liquid soap container which confines a hollow space for receiving liquid soap therein, said soap container having a bottom wall which is formed with an outlet port and which has a bottom surface;
a flow control unit including: a tubular body with an open front portion and a closed rear portion which is formed with adjacent first and second annular outward projections that respectively confine a through-hole communicated with an interior of said tubular body, said tubular body being secured to said bottom surface of said bottom wall of said liquid soap container such that said through-hole of said first annular outward projection is aligned with said outlet port, said closed rear portion of said tubular body being further formed with an upright soap outlet disposed adjacent to and communicated with said through-hole of said second annular outward projection, said second annular outward projection having a lower end which is formed with a valve seat, and a first ball member disposed movably within said second annular outward projection on said valve seat, said second annular outward projection and said first ball member serving as a ball valve unit to control flow of said liquid soap through said soap outlet; and a plunger having a piston which extends fittingly and movably into said tubular body via said open front portion, and a flexible shaft portion which has a first end connected to said piston and a second end; and
an actuating unit mounted on said liquid soap container and including: an infrared unit for detecting a target; a driving unit connected to said infrared unit and activated by said infrared unit upon detection of said target; a speed changing gear set driven rotatably by said driving unit; a driving gear driven rotatably by said speed changing gear set, said second end of said shaft portion of said plunger being connected eccentrically to said driving gear, rotation of said driving gear resulting in linear movement of said piston of said plunger within said tubular body to open said ball valve unit and dispense a predetermined amount of said liquid soap through said soap outlet; and a contact switch disposed on one side of said driving gear and activated by said driving gear when said driving gear completes one revolution, said contact switch being connected to said driving unit and deactivating said driving unit when activated.

2. The automatic liquid soap dispenser as claimed in claim 1, wherein said first annular outward projection has a lower portion which is formed with a plurality of angularly spaced and inwardly projecting radial ribs, said first annular outward projection being provided with a second ball member therein to control flow of said liquid soap into said tubular body.

3. The automatic liquid soap dispenser as claimed in claim 1, wherein said driving unit is a motor with an output shaft, and said speed changing gear set includes a first small gear wheel which is secured on said output shaft of said driving unit, a large gear wheel which meshes with said first small gear wheel, and a second small gear wheel which is formed on one side of said large gear wheel and which meshes with said driving gear.

4. The automatic liquid soap dispenser as claimed in claim 1, wherein said driving gear has one side which is formed with an eccentric annular projection, and said second end of said shaft portion of said plunger is formed with a retaining ring that is sleeved around said eccentric annular projection.

5. The automatic liquid soap dispenser as claimed in claim 4, wherein said retaining ring is formed with a switch actuator which projects radially outward therefrom and which presses against said contact switch so as to activate said contact switch when said driving gear completes one revolution.

* * * * *